Patented May 25, 1937

2,081,153

UNITED STATES PATENT OFFICE 2,081,153

SYNTHETIC RESIN

Israel Rosenblum, Jackson Heights, N. Y.

No Drawing. Application January 2, 1930, Serial No. 418,161

12 Claims. (Cl. 260—4)

My invention relates to a method of producing synthetic resins of novel character and composition, and has for one of its principal objects to produce a resin having a high melting point, a wide range of solubility in the common, and particularly in the less expensive lacquer and varnish solvents, great weatherproofness and durability, and compatibility with nitrocellulose lacquers, producing therewith a tough, transparent, waterproof, durable, flexible and highly adherent film. Other objects will become apparent from the following description and the features of novelty will be pointed out in the claims.

In my co-pending application, Serial No. 371,066, filed June 14, 1929, I have described a method of producing complex resins by causing interaction between, for example, a phenol, an aldehyde, an organic salt of a metal, such as zinc abietate, a natural resin such as rosin, and glycerol. As described in said application, the phenol, aldehyde and organic salt are heated together in proper quantities to produce a fusible and soluble phenol-aldehyde-organic salt complex, preferably in the presence of a solvent such as rosin. When this initial reaction is complete, the water is removed, and the natural resin (rosin) is then added to the condensate (if no such resin, or an insufficient quantity, is present). To this complex and natural resin I then add an excess of a polyhydric alcohol, preferably glycerol (based on the quantity of natural resin present) which upon heating combines with the natural resin to form a relatively large quantity of mono and di-resinate. The mass is then heated up to about 250° C. to cause the glycerol mono and di-esters to combine with the initial phenol-aldehyde-organic salt condensation product to form a phenol-formaldehyde-zinc abietate-glycerol mono and di-resinate or abietate complex of very high molecular weight, high melting point, large range of solubility in varnish and lacquer solvents, and of substantially neutral character, having an acid number of about ten or below. This reaction may be explained, as stated in said application, by the discovery I have made that when a natural resin is heated with a phenol-aldehyde-organic salt complex, the course and nature of the dry distillation of the resin are altered in such manner that glyceridic mono and di-esters (or partial esters of other polyhydric alcohols) will be produced at comparatively low temperatures upon the addition of the polyhydric alcohol, without the production of undesirable non-plastic compounds, which appear to be of a ketonic or lactonic nature and precipitate out of ethyl acetate solutions. These undesirable compounds may be destroyed by heating the mass to a higher temperature, but they are then converted into acidic substances which neutralize the partially esterified polyhydric alcohol and thus prevent the desired reaction between the latter and the phenol-aldehyde-organic salt complex. If desired, all of the raw materials, including the glycerol, may be mixed together and heated en masse; the oxide of the metal named may be employed instead of its salt so as to provoke the formation of the organic salt complex. In this manner I obtain a highly complex resin which I consider to be largely a mixed glyceride of the acidic phenol-aldehyde-organic salt complex and the rosin acids (principally abietic acid).

I have now found that instead of using glycerol (or other polyhydric alcohol) to esterify and neutralize the phenol-aldehyde-organic salt and dry distilled rosin complex, this neutralization may with advantage be effected by means of polyhydric alcohols which have been partially esterified with acids of the aliphatic or aromatic series, including the polybasic acids, or with other organic compounds, such as benzene halides, capable of reacting with alcohols.

The use of polyhydric alcohols partially esterified with an acid or acids of the fatty or aliphatic series is described and claimed in my co-pending application, Serial No. 418,162, filed simultaneously herewith, and I shall confine my description in the present application to the use of polyhydric alcohols partially esterified with acids of the aromatic series.

In carrying out my invention, I may first form the partial glycerides of the aromatic acid, such as phthalic acid or its anhydride, by causing a quantity of such acid to react with an excess of glycerol with the application of heat, the water being driven off as it is formed, or when the reaction is complete. In this way I obtain partial esters of glycerol and phthalic acid in which each molecule contains one or more OH or hydroxyl groups. I then add these partial esters to a quantity of the resin complex (or vice versa)

obtained by heating together a phenol, an aldehyde, an organic salt of a metal and a natural resin such as rosin, and heat the mixture until a highly complex mass of low acid number is produced.

The reactions involved, when glycerol and phthalic acid are used, may be represented as follows:

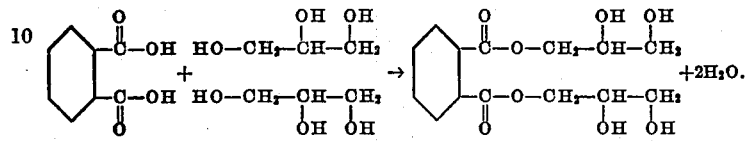

This tetrahydroxy diglycerol phthalate is then caused to react with the phenol-aldehyde-organic salt complex and with the dry distilled rosin (or other natural resin or mixtures of such resins) whose formulas may be represented by R—OH and R'—H, respectively:

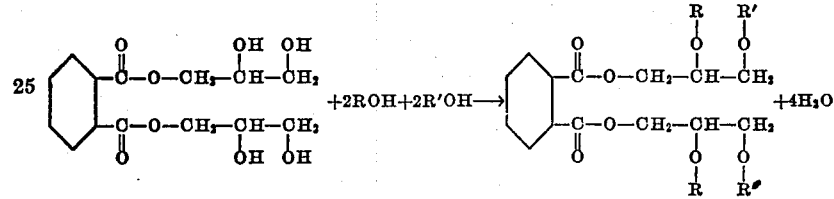

This final compound is, of course, not the only compound present; in fact, it may be only one of the simpler compounds, the final mixture very probably containing also the neutralized highly complex aromatic alcohols formed by the condensation of tetrahydroxy diglycerol phthalate either by itself or with glycerol or with other hydroxy compounds that may be formed in intermediate reactions.

If desired, only part of the total number of hydroxyl groups may be reacted upon by the mentioned phenol-aldehyde-organic salt-rosin complex, as in the following Example 7.

Among the other more simple reactions, the following may take place:

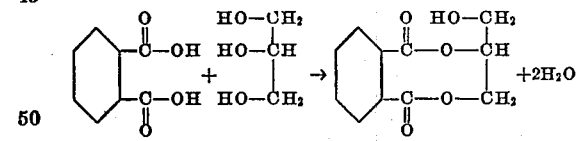

The monohydroxy glycerol phthalate may then react with the natural or artificial resin present to form the following neutral compound:

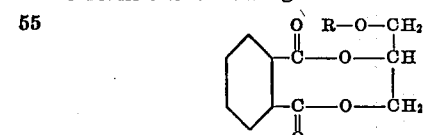

As already indicated, the final product may contain components of far higher molecular weight than even the compounds whose formulas are given above.

As is well known to those skilled in the art, the formulas and composition of condensates or complexes such as those described above are practically impossible of definite determination by any known means. A long and careful study of the reactions entering into the formation of my final product has, however, led me to the conclusion that such product is very probably composed at least partially, if not entirely, of definite chemical compounds of extraordinarily high molecular weight and I believe that the valuable properties of my novel product are due in part to its high average molecular weight. The same uncertainty exists with respect to the complex formed by heating a phenol, an aldehyde, an organic salt of a metal and rosin. The phenol and aldehyde, as is known, combine or condense with the elimination of water and in my opinion the organic salt is chemically combined with the phenol-aldehyde condensate. The rosin (or other natural resin) acts as a solvent for the condensate, while the latter, probably under the catalytic influence of the organic salt, appears to change the course of dry distillation of the natural resin, as explained above. Where, therefore, I employ the expression "phenol-aldehyde-organic salt-rosin (or natural resin) complex", both in the specification and claims, the same is to be understood to mean the product obtained by condensing a phenol, an aldehyde, and an organic salt in the presence of a natural resin, or by heating the phenol-aldehyde-organic salt condensate with a natural resin, regardless of what the true chemical nature of the product may be.

The melting point of my novel complex resinous products is generally so high that they can be used for rubbing lacquers; these products in addition have remarkable water and weather-proofing properties when made up into varnishes or lacquers.

In place of glycerol other polyhydric alcohols may be used, while in place of phthalic acid there may be used other (preferably dibasic) aromatic acids, including substituted acids, and also, in general, substituted aromatic hydrocarbons and other aromatic compounds capable of reacting with a polyhydric alcohol to partially neutralize the latter. The organic salt may be the resinate, abietate, oleate, tungate, stearate, acetate, etc. of zinc, calcium, barium, strontium, manganese, lead, cobalt, and in certain instances the corresponding salts of the alkali metals, etc. I prefer to employ an organic salt of zinc of high molecular weight, such as zinc abietate. In place of rosin, which may be cracked or not, I may employ other natural resins such as congo, dammar, pontianac, sandarac, etc., or mixtures of natural resins.

I shall describe my invention in detail by means of the following examples, but the same are to be understood as illustrative of and not as limiting the invention.

*Example 1*

150 pounds of phthalic anhydride and 200 pounds of glycerol are heated to 230°–250° C. for about 6 hours. There are then added 1200 pounds of a phenol-aldehyde-organic salt-rosin complex, prepared as described in my co-pending application, Serial No. 371,066, now Patent No.

1,808,716, by condensing a phenol and an aldehyde in the presence of an organic salt, such as the resinate, abietate, oleate, tungate, stearate, acetate, etc., of zinc, calcium, strontium, barium, manganese, cobalt, lead, the alkali metals, etc., and in the presence of rosin or other natural resin. The temperature is kept at about 230°–240° C. Vacuum can be applied and the heating continued until a sample dissolves to a clear solution in toluol and is substantially neutral.

*Example 2*

150 pounds of phthalic anhydride are heated with 200 pounds of glycerol to 230°–250° C. for about 8 hours. There are then added 600 pounds of a phenol-aldehyde-organic salt-rosin complex and 1000 pounds of cracked or dry distilled fossil gum. The mixture is heated to about 230° C. or higher until a gum soluble in mineral spirits is obtained.

*Example 3*

Heat 150 pounds of phthalic anhydride and 100 pounds of glycerol to 230°–240° C. for about 2 hours. Add 350 pounds of phenol-aldehyde-organic salt-rosin complex and continue heating to 230° C. Vacuum is applied until the product is soluble in toluol.

*Example 4*

Like Example 1, 2 or 3, with the exception that all of the ingredients are added at once and heated together.

While these examples describe the use of phthalic anhydride, which is the preferred aromatic acid, other acidic aromatic compounds may be used, as follows:

*Example 5*

224 pounds of diphenyl dichloride

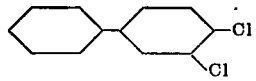

are heated with 100 pounds of glycerol at about 230° C. until the evolution of HCl ceases and the partial esterification of the glycerol is complete. There are then added 320 pounds of a phenol-aldehyde-organic salt-rosin complex and the mixture heated at 240°–250° C. until a sample of the product dissolves to a clear solution in toluol.

*Example 6*

Same as Example 5, except that, in place of the 320 pounds of phenol-aldehyde-organic salt-rosin complex, there are added 160 pounds of the complex and 250 pounds of cracked or dry distilled fossil resin, such as congo, manila, pontianac, dammar, etc.

If desired, benzoic acid and the halogen or other substitution products of benezene may be used in the reactions given above to esterify or neutralize partially the polyhydric alcohol. In place of the acidic derivatives or substitution products of benzene, the corresponding derivatives or substitution products of condensed benzene nuclei, such as naphthalene and anthracene, may be used; for example, dichlor naphthalene, dicarboxy anthracene, etc.

*Example 7*

150 pounds of phthalic anhydride and 200 pounds of glycerine are heated to about 230° C. for about 4 hours. Add 600 pounds of a phenol-aldehyde-organic salt-rosin complex and continue heating by gradually raising the temperature to about 250° C. Reaction is finished when the product dissolves clear in toluol.

What is claimed is:

1. The method which comprises reacting a phenol-aldehyde-organic salt of zinc-rosin reaction mass with a polyhydric alcohol partially neutralized with a corboxylic aromatic acid until a substantially neutral product is obtained.

2. The method which comprises reacting a phenol-aldehyde-organic salt of zinc-rosin reaction mass with a polyhydric alcohol partially esterified with a carboxylic aromatic acid or its anhydride.

3. The method which comprises reacting a phenol-aldehyde-organic salt of zinc-rosin reaction mass with glycerol partially esterified with phthalic acid or its anhydride.

4. The method which comprises reacting a phenol-aldehyde-zinc abietate-rosin reaction mass with a polyhydric alcohol partially neutralized with a carboxylic armomatic acid until a substantially neutral product is obtained.

5. The method which comprises reacting a phenol-aldehyde-zinc abietate-rosin reaction mass with glycerol partially esterified with phthalic acid or its anhydride.

6. The method which comprises reacting a phenol and an aldehyde in the presence of a natural resin until a fusible, soluble resin is produced, and then reacting such resin with a polyhydric alcohol partially neutralized with a carboxylic aromatic acid.

7. An oil-soluble resin comprising the reaction product of a phenol-aldehyde resin dissolved in a natural resin, and a polyhydric alcohol partially neutralized with a carboxylic aromatic acid.

8. The method which comprises reacting the condensation product of a phenol, an aldehyde, and a natural resin with a polyhydric alcohol partially esterified with a corboxylic aromatic acid or its anhydride and containing a considerable proportion of free basic hydroxyl groups.

9. The method which comprises reacting the condensation product of a phenol, an aldehyde, and a natural resin with a polyhydric alcohol partially esterified with phthalic acid or its anhydride and containing a considerable proportion of free basic hydroxyl groups.

10. The method which comprises reacting the condensation product of a phenol, an aldehyde, rosin and a metal compound of the group consisting of the acetates, the natural resin acid salts, and the soaps of fatty oil and fat acids of zinc, calcium, barium, strontium, manganese, lead, cobalt and the alkali metals, with glycerol partially esterified with phthalic acid or its anhydride and containing a considerable proportion of free basic hydroxyl groups.

11. The method which comprises condensing a phenol and an aldehyde in the presence of a natural resin and of a metal compound of the group consisting of the acetates, the natural resin acid salts, and the soaps of fatty oil and fat acids of zinc, calcium, barium, strontium, manganese, lead, cobalt and the alkali metals, and neutralizing the resulting reaction mass at about 230°–240° C. with glycerol partially esterified with a carboxylic aromatic acid or its anhydride and containing a considerable proportion of free basic hydroxyl groups.

12. A composition of matter comprising the reaction product of a phenol, an aldehyde, zinc abietate and rosin with glycerol partially esterified which phthalic acid or its anhydride and containing a considerable proportion of free basic hydroxyl groups.

ISRAEL ROSENBLUM.